(12) United States Patent
Takahashi

(10) Patent No.: US 10,536,045 B2
(45) Date of Patent: Jan. 14, 2020

(54) ROTOR FOR ROTATING ELECTRIC MACHINE

(71) Applicant: DENSO CORPORATION, Kariya, Aichi-pref. (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 360 days.

(21) Appl. No.: 15/609,428

(22) Filed: May 31, 2017

(65) Prior Publication Data

US 2017/0353065 A1 Dec. 7, 2017

(30) Foreign Application Priority Data

Jun. 3, 2016 (JP) .................................. 2016-112258

(51) Int. Cl.
*H02K 1/24* (2006.01)
*H02K 21/04* (2006.01)
*H02K 1/27* (2006.01)

(52) U.S. Cl.
CPC ............... *H02K 1/243* (2013.01); *H02K 1/27* (2013.01); *H02K 21/044* (2013.01)

(58) Field of Classification Search
CPC ........ H02K 1/243; H02K 1/27; H02K 21/044; H02K 21/046
See application file for complete search history.

(56) References Cited

U.S. PATENT DOCUMENTS

| | | | | |
|---|---|---|---|---|
| 3,230,404 A * | 1/1966 | Graham | ................. | H02K 1/243 310/51 |
| 5,306,977 A * | 4/1994 | Hayashi | ................. | H02K 1/243 310/192 |
| 6,424,073 B1* | 7/2002 | Kometani | ................ | H02K 1/16 310/179 |
| 2007/0046137 A1* | 3/2007 | Ooiwa | ................. | H02K 21/044 310/263 |
| 2007/0046138 A1* | 3/2007 | Ooiwa | .................. | H02K 15/03 310/263 |
| 2007/0262672 A1* | 11/2007 | Maekawa | ............ | H02K 21/044 310/263 |
| 2008/0079322 A1* | 4/2008 | Kanazawa | ............. | H02K 1/145 310/44 |
| 2009/0001843 A1* | 1/2009 | Enomoto | ................ | H02K 1/145 310/257 |
| 2009/0152979 A1* | 6/2009 | Isogai | .................. | H02K 21/044 310/263 |

FOREIGN PATENT DOCUMENTS

JP 2001-359263 A 12/2001

* cited by examiner

*Primary Examiner* — Mohamad A Musleh
(74) *Attorney, Agent, or Firm* — Oliff PLC

(57) ABSTRACT

A rotor for a rotating electric machine includes a field core having a plurality of claw-shaped magnetic pole portions, a field coil wound on the field core, and a hollow cylindrical core member disposed to cover radially outer peripheries of the claw-shaped magnetic pole portions of the field core. The core member is formed of a plurality of soft-magnetic bodies that are laminated in an axial direction of the core member. At least some of the soft-magnetic bodies forming the core member are fixed to one another by at least one staking portion that is formed along the axial direction of the core member.

6 Claims, 6 Drawing Sheets

ROTOR FOR ROTATING ELECTRIC MACHINE

CROSS-REFERENCE TO RELATED APPLICATION

This application is based on and claims priority from Japanese Patent Application No. 2016-112258, filed on Jun. 3, 2016, the content of which is hereby incorporated by reference in its entirety into this application.

BACKGROUND

1 Technical Field

The present invention relates to rotors for rotating electric machines that are used in, for example, motor vehicles as electric motors and electric generators.

2 Description of Related Art

There are known rotating electric machines which include a stator having a stator coil wound on a stator core and a rotor that is rotatably disposed so as to radially face the stator through an electromagnetic gap formed therebetween.

Moreover, there are also known Lundell-type rotors which include a field core and a field coil. The field core has a cylindrical boss portion fixed on a rotating shaft and a plurality of claw-shaped magnetic pole portions located radially outward of the boss portion. In operation, the claw-shaped magnetic pole portions respectively form a plurality of magnetic poles whose polarities alternate between north and south in a circumferential direction of the rotating shaft. The field coil is wound on a radially outer periphery of the boss portion of the field core and generates a magnetomotive force upon being energized.

Japanese Patent Application Publication No. JP2009148057A discloses a hollow cylindrical (or annular) core member employed in a Lundell-type rotor. The core member is formed of a laminate obtained by laminating a plurality of soft-magnetic sheets in an axial direction of the core member. The core member is arranged on the radially outer peripheries of the claw-shaped magnetic pole portions of the field core. Moreover, the core member has, on a radially outer surface thereof, a plurality of protrusions, a plurality of recesses and a plurality of slopes. Each of the protrusions has the same profile as a corresponding one of the claw-shaped magnetic pole portions of the field core and is located so as to be coincident with the corresponding claw-shaped magnetic pole portion in the circumferential direction of the rotating shaft. The recesses are formed alternately with the protrusions in the circumferential direction. Each of the recesses is located so as to be coincident with a corresponding one of air gaps formed between the claw-shaped magnetic pole portions of the field core in the circumferential direction. Each of the slopes is inclined relative to a radial direction of the rotating shaft and connects a circumferentially-adjacent pair of one of the protrusions and one of the recesses. Consequently, with the core member, it is possible to reduce fluctuation in magnetic flux transferred between the rotor and the stator during rotation of the rotor. As a result, it is possible to reduce magnetic noise caused by the fluctuation in the magnetic flux.

However, the inventor of the present application has found that the core member disclosed in the above patent document involves the following problems.

Since the core member has the protrusions and recesses formed on the radially outer surface thereof, stress concentration may occur at locations where the radial widths of the soft-magnetic sheets forming the core member are small, thereby causing a stress-induced failure to occur. Moreover, during rotation of the rotor, the claw-shaped magnetic pole portions of the field core are deformed radially outward due to the centrifugal force, thereby inducing stress in the core member. Moreover, the closer to the distal ends of the claw-shaped magnetic pole portions, the higher the stress induced in the core member by the radially outward deformation of the claw-shaped magnetic pole portions. Consequently, concentration of the stress induced by the radially outward deformation of the claw-shaped magnetic pole portions may occur in the core member.

SUMMARY

According to an exemplary embodiment, there is provided a rotor for a rotating electric machine. The rotor includes a field core having a plurality of claw-shaped magnetic pole portions, a field coil wound on the field core, and a hollow cylindrical core member disposed to cover radially outer peripheries of the claw-shaped magnetic pole portions of the field core. The core member is formed of a plurality of soft-magnetic bodies that are laminated in an axial direction of the core member. At least some of the soft-magnetic bodies forming the core member are fixed to one another by at least one staking portion that is formed along the axial direction of the core member.

With the above configuration, the at least some of the soft-magnetic bodies are fixed to one another with residual stress at the at least one staking portion dispersed in the circumferential direction of the core member and thus without concentration of the residual stress in the core member. Moreover, during rotation of the rotor, the claw-shaped magnetic pole portions of the field core are deformed radially outward due to the centrifugal force, thereby inducing stress in the core member that covers the radially outer peripheries of the claw-shaped magnetic pole portions. However, since the at least some of the soft-magnetic bodies are fixed to one another by the at least one staking portion, the stress induced by the radially outward deformation of the claw-shaped magnetic pole portions can be transferred between the at least some of the soft-magnetic bodies. Consequently, it becomes possible to prevent concentration of the stress induced by the radially outward deformation of the claw-shaped magnetic pole portions from occurring in the core member and thereby ensure high strength of the core member.

In further implementations, the rotor may further include a plurality of permanent magnets. Each of the permanent magnets is arranged between one circumferentially-adjacent pair of the claw-shaped magnetic pole portions with its axis of easy magnetization oriented in the circumferential direction of the core member. Moreover, each of the permanent magnets has its north pole facing one of the circumferentially-adjacent pair of the claw-shaped magnetic pole portions which is magnetized to form a north pole upon energization of the field coil and its south pole facing the other of the circumferentially-adjacent pair of the claw-shaped magnetic pole portions which is magnetized to form a south pole upon energization of the field coil.

The at least one staking portion may include a plurality of staking portions each of which is formed along the axial direction of the core member. In this case, it is preferable that the plurality of staking portions are arranged at unequal pitches in the circumferential direction of the core member.

It is preferable that the number of the at least one staking portion in the circumferential direction of the core member is set to be different from the number of the claw-shaped magnetic pole portions of the field core.

It is also preferable that the number of the at least one staking portion in the circumferential direction of the core member is set to a prime number.

It is preferable that all of the soft-magnetic bodies forming the core member are fixed to one another by the at least one staking portion.

The claw-shaped magnetic pole portions of the field core may include a plurality of first claw-shaped magnetic pole portions and a plurality of second claw-shaped magnetic pole portions. The field core may consist of a pair of first and second pole cores. The first pole core has a first boss portion, a plurality of first disc portions and the first claw-shaped magnetic pole portions. The first boss portion is cylindrical in shape. The first disc portions each extend radially outward from an axially outer part of the first boss portion and are circumferentially spaced at a predetermined pitch. Each of the first claw-shaped magnetic pole portions axially extends toward the second pole core from a radially outer part of one of the first disc portions. The second pole core has a second boss portion, a plurality of second disc portions and the second claw-shaped magnetic pole portions. The second boss portion is cylindrical in shape. The second disc portions each extend radially outward from an axially outer part of the second boss portion and are circumferentially spaced at a predetermined pitch. Each of the second claw-shaped magnetic pole portions axially extends toward the first pole core from a radially outer part of one of the second disc portions. The first claw-shaped magnetic pole portions of the first pole core are interleaved with the second claw-shaped magnetic pole portions of the second pole core. The field coil is wound on radially outer peripheries of the first and second boss portions so that upon energization of the field coil, the first and second claw-shaped magnetic pole portions are magnetized to respectively form a plurality of magnetic poles whose polarities alternate between north and south in the circumferential direction of the core member.

BRIEF DESCRIPTION OF THE DRAWINGS

The present invention will be understood more fully from the detailed description given hereinafter and from the accompanying drawings of one exemplary embodiment, which, however, should not be taken to limit the present invention to the specific embodiment but are for the purpose of explanation and understanding only.

In the accompanying drawings.

DESCRIPTION OF EMBODIMENT

Figure 1:
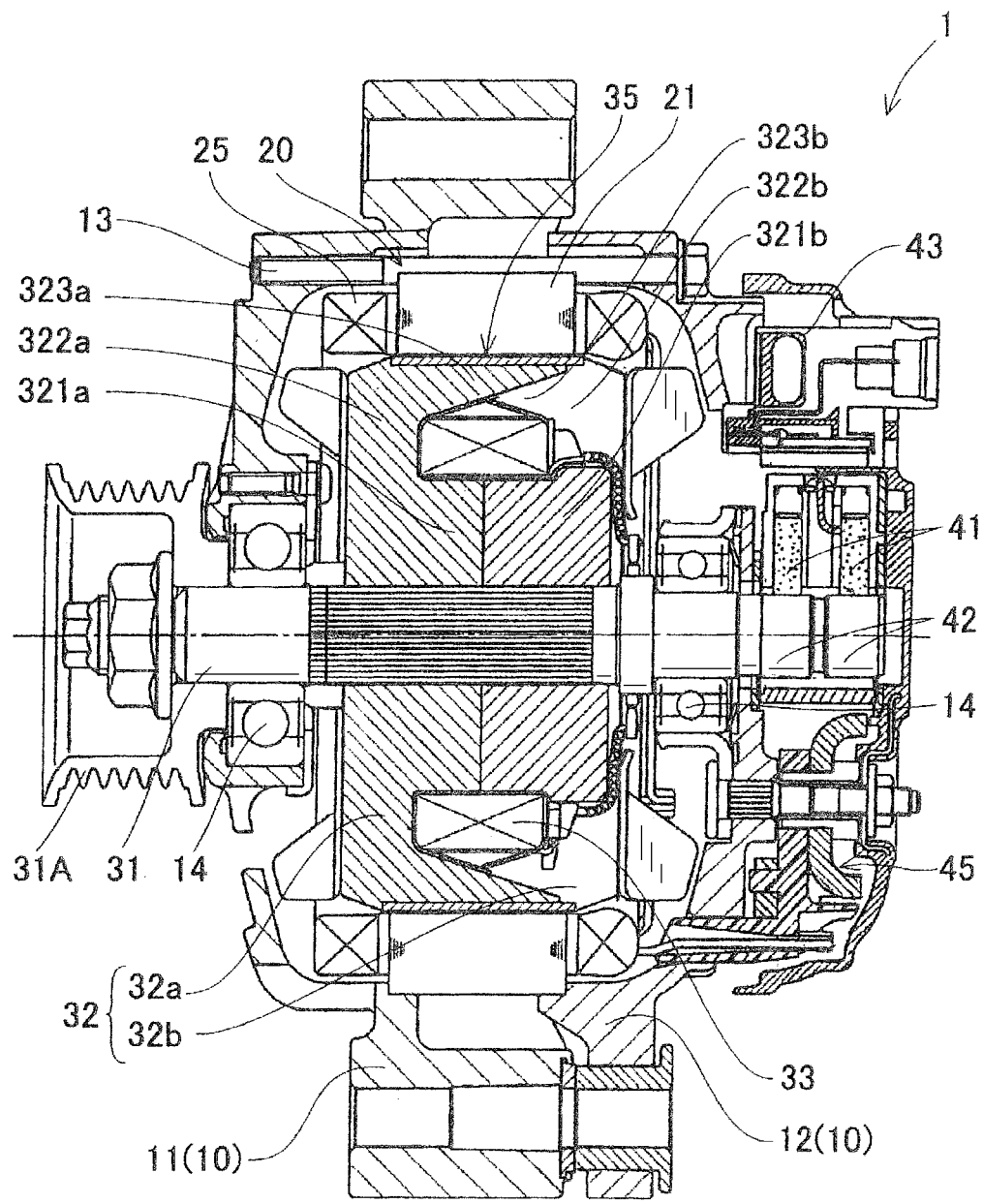
FIG. 1 is a schematic cross-sectional view, along an axial direction, of a rotating electric machine which includes a rotor according to an exemplary embodiment.
Figure 2:
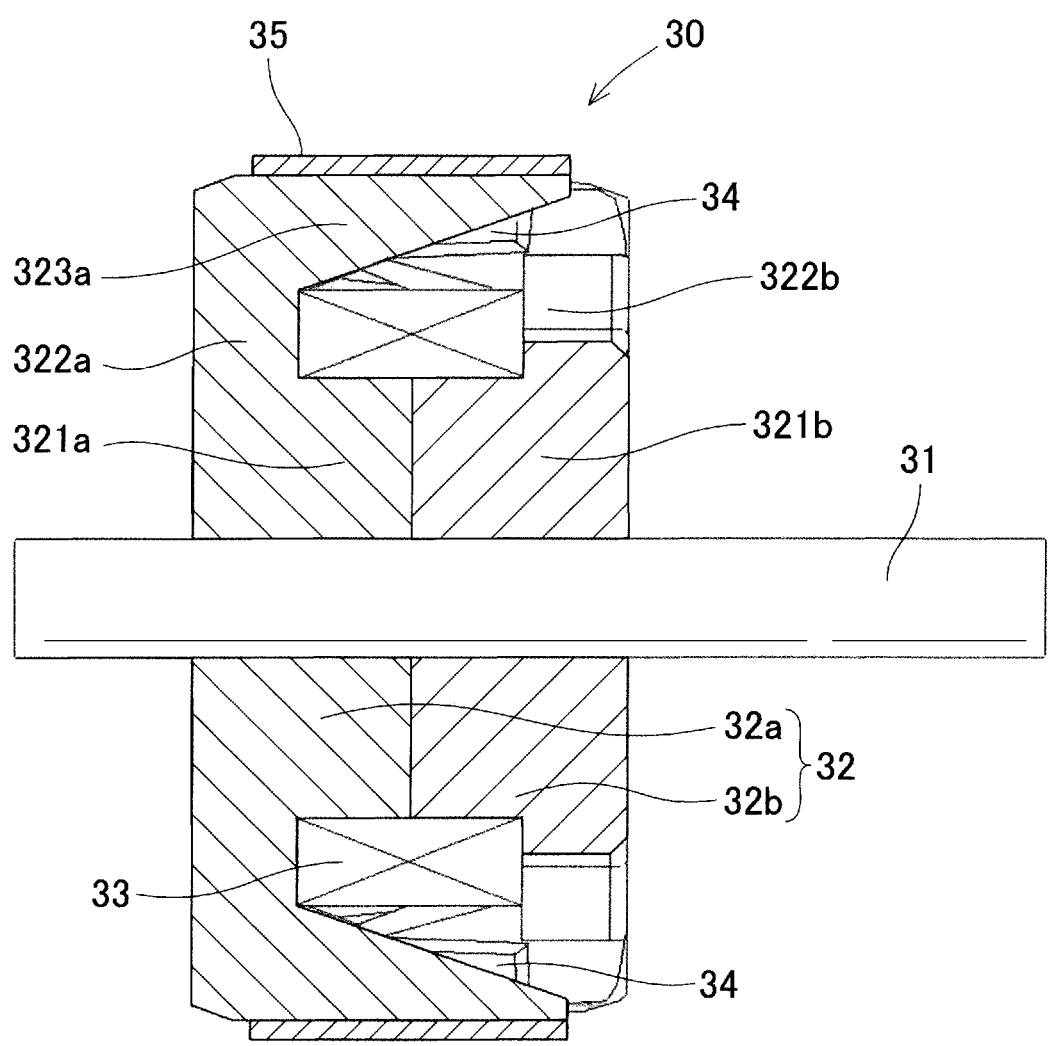
FIG. 2 is a schematic cross-sectional view of the rotor along the axial direction.

FIG. 1 shows the overall configuration of a rotating electric machine 1 which includes a rotor 30 according to an exemplary embodiment.

In the present embodiment, the rotating electric machine 1 is configured as an automotive alternator for use in a motor vehicle, such as a passenger car or a truck.

As shown in FIG. 1, the alternator 1 includes a housing 10, a stator 20, the rotor 30, a field coil energization mechanism, a regulator 43 and a rectifier 45.

The housing 10 consists of a front housing 11 and a rear housing 12. Each of the front and rear housings 11 and 12 is substantially cup-shaped to have an open end. The front and rear housings 11 and 12 are fastened together, by a plurality of bolts 13, with the open ends thereof opposed to each other.

The stator 20 includes an annular stator core 21 and a three-phase stator coil (or armature coil) 25. The stator core 21 has a plurality of teeth (not shown) and a plurality of slots (not shown) formed therein. The teeth each radially extend and are circumferentially spaced at a predetermined pitch. Each of the slots is formed between one circumferentially-adjacent pair of the teeth. The stator coil 25 is comprised of three phase windings (e.g., U-phase, V-phase and W-phase windings) that are wound on the stator core 21 so as to be received in the slots of the stator core 21. In addition, the stator core 21 is fixed to the inner surfaces of circumferential walls of the front and rear housings 11 and 12 such that the stator core 21 is axially sandwiched between the front and rear housings 11 and 12.

The rotor 30 is located radially inside the stator 20 so as to be surrounded by the stator 20. The rotor 30 includes a rotating shaft 31 that is rotatably supported by the housing 10 via a pair of bearings 14.

In the present embodiment, the rotor 30 is configured as a Lundell-type rotor which includes a field core 32 and a field coil 33. The field core 32 consists of a pair of first and second pole cores 32a and 32b. The first pole core 32a has a plurality of first claw-shaped magnetic pole portions 323a formed therein. The second pole core 32b has a plurality of second claw-shaped magnetic pole portions 323b formed therein.

The rotor 30 is driven to rotate by an engine (not shown) of the vehicle via a pulley 31A that is fixed on a front end portion of the rotating shaft 31.

The field coil energization mechanism is configured to energize (or supply field current If to) the field coil 33 during rotation of the rotor 30. The field coil energization mechanism includes a pair of brushes 41 and a pair of slip rings 42. The slip rings 42 are provided on a rear end portion of the rotating shaft 31 and respectively electrically connected with opposite ends of the field coil 33. The brushes 41 are configured to respectively make sliding contacts with the slip rings 42 during rotation of the rotor 30.

The rectifier 45 is configured to rectify three-phase AC power outputted from the three-phase stator coil 25 into DC power.

The regulator 43 is configured to regulate an output voltage of the alternator 1 by controlling the field current If supplied to the field coil 33.

The alternator 1 operates as follows. Upon transmission of torque (or rotating force) from the engine to the pulley 31A via a belt (not shown), the rotor 30 rotates in a predetermined direction. During rotation of the rotor 30, the field current If is supplied to the field coil 33 via the sliding contacts between the brushes 41 and the slip rings 42. With the supply of the field current If to the field coil 33, the first and second claw-shaped magnetic pole portions 323a and 323b of the first and second pole cores 32a and 32b are magnetized to respectively form a plurality of magnetic poles; the polarities of the magnetic poles alternate between north and south in a circumferential direction of the rotor 30. Consequently, a rotating magnetic field is created which causes the three-phase AC power to be generated in the stator coil 25. The three-phase AC power is then rectified by the rectifier 45 into the DC power. The DC power is used to, for example, charge a battery (not shown) provided in the vehicle. Moreover, the output voltage of the alternator 1 (or the voltage of the DC power) is regulated by the regulator 43.

Next, the characteristic configuration of the rotor 30 according to the present embodiment will be described in detail with reference to FIGS. 2-8.

In the present embodiment, the rotor 30 includes the rotating shaft 31, the field core 32, the field coil 33, a plurality of permanent magnets 34 and a hollow cylindrical (or annular) core member 35. The rotating shaft 31 is rotatably supported by the housing 10 via the pair of bearings 14. The field core 32 consists of the first and second pole cores 32a and 32b that are fixedly fitted on the outer periphery of the rotating shaft 31. The field coil 33 is wound on the field core 32. Each of the permanent magnets 34 is arranged between one circumferentially-adjacent pair of the first and second claw-shaped magnetic pole portions 323a and 323b of the first and second pole cores 32a and 32b. The core member 35 is disposed to cover (or surround) the radially outer peripheries of the first and second claw-shaped magnetic pole portions 323a and 323b of the first and second pole cores 32a and 32b. In addition, the rotor 30 is rotatably disposed radially inside the stator 20 so as to radially face the stator 20 through an electromagnetic gap formed therebetween (see FIG. 1).

Figure 3:
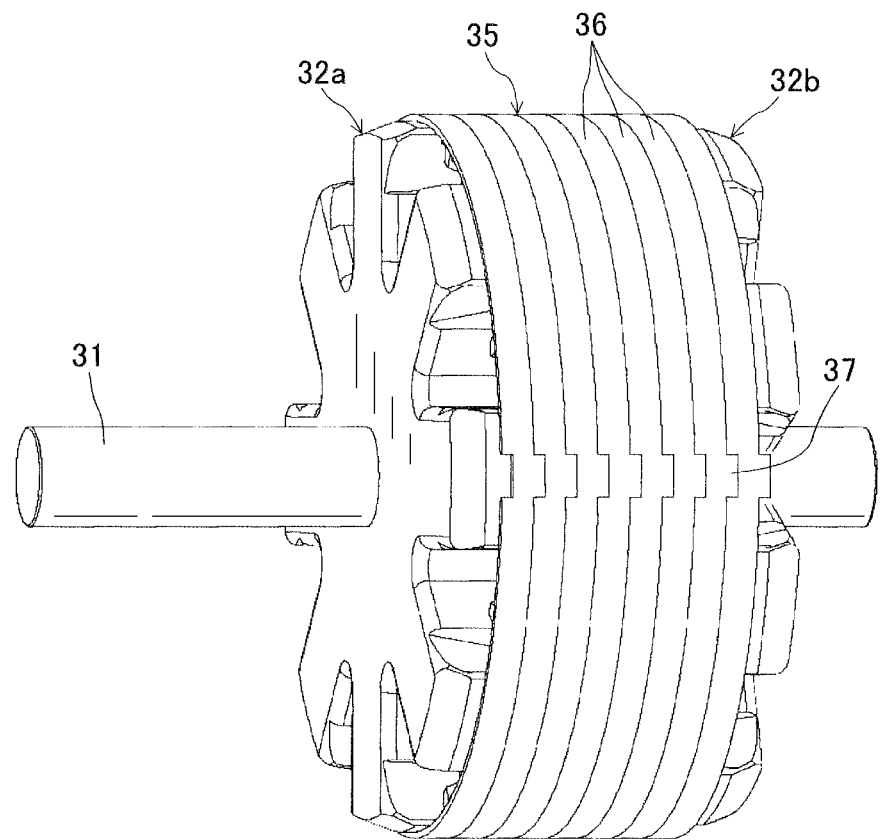
FIG. 3 is a perspective view of the rotor.
Figure 4:
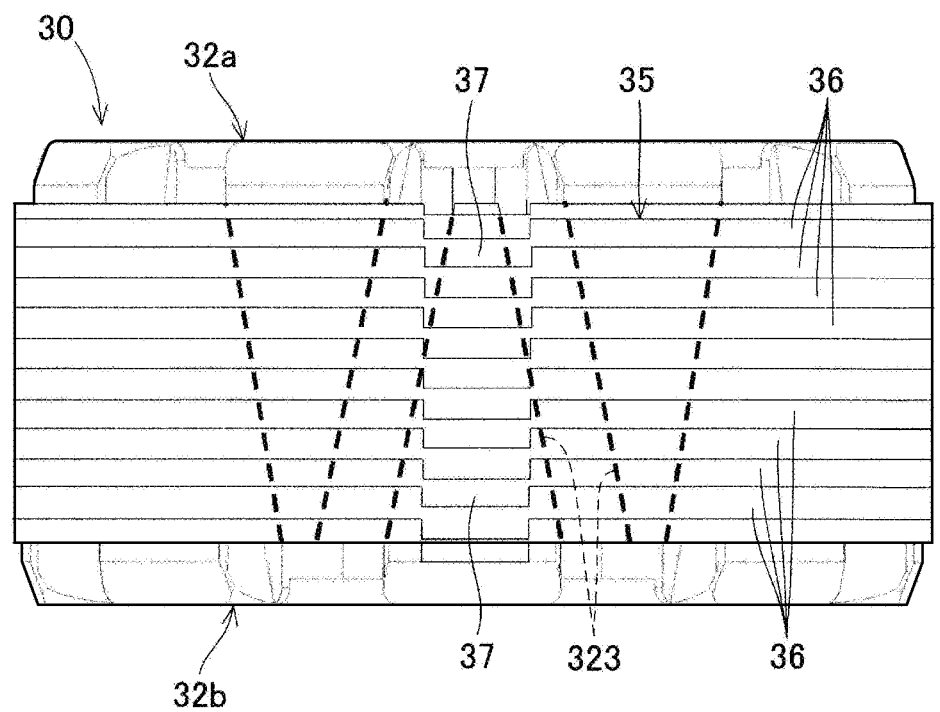
FIG. 4 is a plan view, from the radially outside, of the rotor.

Specifically, the field core 32 has the first pole core 32a located on the front side (i.e., the left side in FIGS. 1-3 and 7 and the upper side in FIG. 4) and the second pole core 32b located on the rear side (i.e., the right side in FIGS. 1-3 and 7 and the lower side in FIG. 4).

The first pole core 32a has a first boss portion 321a, a plurality of first disc portions 322a and the first claw-shaped magnetic pole portions 323a. The first boss portion 321a has a hollow cylindrical shape and is fixedly fitted on the rotating shaft 31. The first boss portion 321a is provided to have field magnetic flux axially flow therethrough on the radially inner side of the field coil 33. The first disc portions 322a each extend radially outward from a front part of the first boss portion 321a and are circumferentially spaced at a predetermined pitch. The first disc portions 322 are provided to have the field magnetic flux radially flow therethrough. Each of the first claw-shaped magnetic pole portions 323a extends backward (i.e., in the axial direction toward the second pole core 32b) from a radially outer part of one of the first disc portions 322a. The first claw-shaped magnetic pole portions 323a are provided to exchange magnetic flux with the stator core 21.

Similarly, the second pole core 32b has a second boss portion 321b, a plurality of second disc portions 322b and the second claw-shaped magnetic pole portions 323b. The second boss portion 321b has a hollow cylindrical shape and is fixedly fitted on the rotating shaft 31. The second boss portion 321b is provided to have the field magnetic flux axially flow therethrough on the radially inner side of the field coil 33. The second disc portions 322b each extend radially outward from a rear part of the second boss portion 321b and are circumferentially spaced at a predetermined pitch. The second disc portions 322 are provided to have the field magnetic flux radially flow therethrough. Each of the second claw-shaped magnetic pole portions 323b extends forward (i.e., in the axial direction toward the first pole core 32a) from a radially outer part of one of the second disc portions 322b. The second claw-shaped magnetic pole portions 323b are provided to exchange magnetic flux with the stator core 21.

The first and second pole cores 32a and 32b are assembled together so that: the first claw-shaped magnetic pole portions 323a are interleaved with the second claw-shaped magnetic pole portions 323b; and the first boss portion 321a and the second boss portion 321b abut each other. Consequently, the first claw-shaped magnetic pole portions 323a of the first pole core 32a are arranged alternately with the second claw-shaped magnetic pole portions 323b of the second pole core 32b in the circumferential direction of the rotor 30.

It should be noted that the first boss portion 321a of the first pole core 32a and the second boss portion 321b of the second pole core 32b may also be integrally formed to make up a common boss portion to the first and second pole cores 32a and 32b.

In the present embodiment, the first and second pole cores 32a and 32b are made of a soft-magnetic material. Moreover, both the number of the first claw-shaped magnetic pole portions 323a of the first pole core 32a and the number of the second claw-shaped magnetic pole portions 323b of the second pole core 32b are set to 8. Consequently, the total number of the claw-shaped magnetic pole portions 323 of the field core 32 is equal to 16 (i.e., 8 north poles and 8 south poles).

The field coil 33 is wound on both the radially outer peripheries of the first and second boss portions 321a and 321b in a state of being electrically insulated from the field core 32. Consequently, the field coil 33 is surrounded by the first and second boss portions 321a and 321b, the first and second disc portions 322a and 322b and the first and second claw-shaped magnetic pole portions 323a and 323b.

In operation, the field current If is supplied from a field current control circuit (not shown) to the field coil 33, thereby inducing a magnetomotive force in the first and second boss portions 321a and 321b. Consequently, the first and second claw-shaped magnetic pole portions 323a and 323b are magnetized to respectively form the magnetic poles whose polarities alternate between north and south in the circumferential direction of the rotor 30. For example, each of the first claw-shaped magnetic pole portions 323a is magnetized to form a south pole while each of the second claw-shaped magnetic pole portions 323b is magnetized to form a north pole.

The field magnetic flux, which is generated in the field core 32 upon energization of the field coil 33, circulates in a magnetic circuit formed in the alternator 1. For example, along the magnetic circuit, the field magnetic flux flows from the first boss portion 321a to the stator core 21 via the first disc portions 322a and the first claw-shaped magnetic pole portions 323a, then flows from the stator core 21 to the second boss portion 321b via the second claw-shaped magnetic pole portions 323b and the second disc portions 322b, and finally returns to the first boss portion 321a. In addition, via the magnetic circuit, a counterelectromotive force is also generated in the rotor 30.

Figure 7:
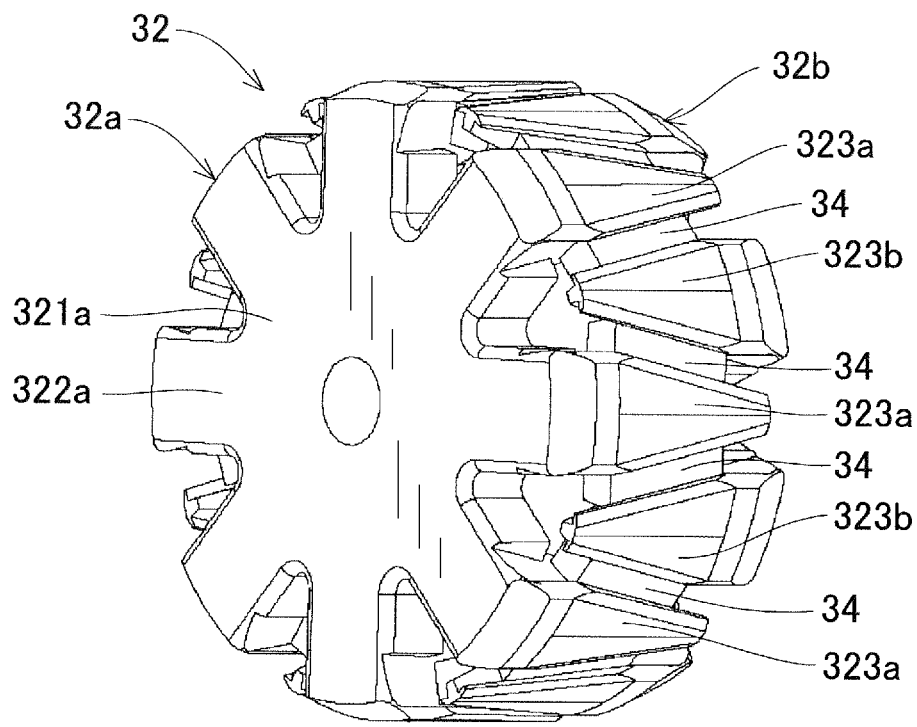
FIG. 7 is a perspective view of the rotor according to the exemplary embodiment omitting a core member of the rotor.

As shown in FIG. 7, between each circumferentially-adjacent pair of the first and second claw-shaped magnetic pole portions 323a and 323b, there is formed a gap that extends obliquely with respect to the axial direction of the rotor 30; in the gap, there is arranged one of the permanent magnets 34. That is, each of the permanent magnets 34 is arranged in one of the gaps formed between circumferentially-adjacent first and second claw-shaped magnetic pole portions 323a and 323b.

Each of the permanent magnets 34 is substantially cuboid-shaped and has its axis of easy magnetization oriented in the circumferential direction of the rotor 30. Moreover, each of the permanent magnets 34 is interposed between and held by one circumferentially-adjacent pair of the first and second claw-shaped magnetic pole portions 323a and 323b with its circumferential end surfaces (magnetic flux entering/exiting surfaces) respectively abutting circumferential side surfaces of the circumferentially-adjacent pair of the first and second claw-shaped magnetic pole portions 323a and 323b. Moreover, each of the permanent magnets 34 is magnetized in such as manner as to reduce magnetic flux leakage between the circumferentially-adjacent pair of the first and second claw-shaped magnetic pole portions 323a and 323b.

Specifically, each of the permanent magnets 34 is magnetized so that: the north pole of the permanent magnet 34 faces one of the circumferentially-adjacent pair of the first and second claw-shaped magnetic pole portions 323a and 323b which is magnetized to form a north pole upon energization of the field coil 33; and the south pole of the permanent magnet 34 faces the other of the circumferentially-adjacent pair of the first and second claw-shaped magnetic pole portions 323a and 323b which is magnetized to form a south pole upon energization of the field coil 33.

As shown in FIGS. 2-5, the core member 35 is formed, by axially laminating a plurality of annular steel sheets 36, into the hollow cylindrical shape. The core member 35 is disposed coaxially and in contact with the field core 32 to cover (or surround) the radially outer peripheries of the claw-shaped magnetic pole portions 323 of the field core 32 (i.e., the first and second claw-shaped magnetic pole portions 323a and 323b of the first and second pole cores 32a and 32b). The core member 35 has the same axial length as the claw-shaped magnetic pole portions 323 of the field core 32. That is, the core member 35 is sized to cover the entire radially outer peripheries of the claw-shaped magnetic pole portions 323. Moreover, each of the steel sheets 36 forming the core member 35 has electrically-insulating layers formed on both axial end surfaces thereof. Consequently, it becomes possible to reduce eddy current loss in the core member 35.

Figure 5:
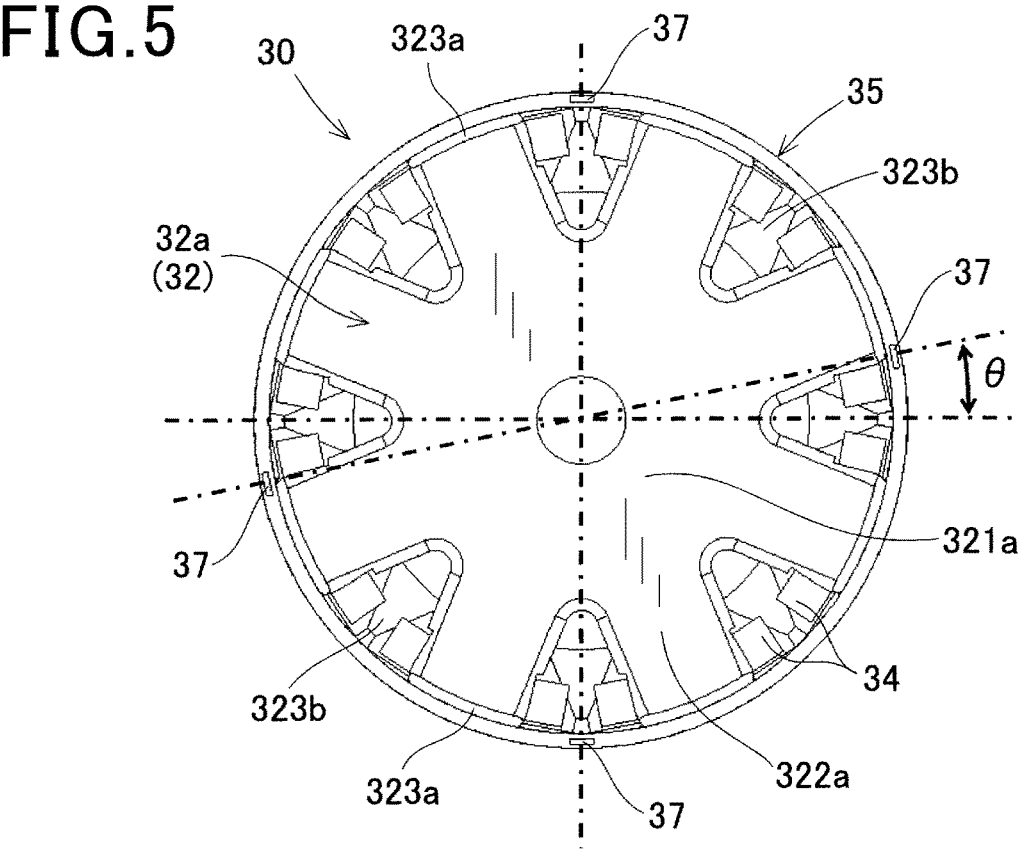
FIG. 5 is an axial end view of the rotor.

In the present embodiment, as shown in FIGS. 3-5, the steel sheets 36, which are laminated to adjoin one another in the lamination direction (or the axial direction of the core member 35), are fixed to one another by a plurality (e.g., four in the present embodiment) of staking portions 37. The staking portions 37 are formed by performing a staking process on the steel sheets 36 in the lamination direction.

In the present embodiment, the steel sheets 36 are axially laminated by fitting the steel sheets 36 onto the radially outer periphery of the field core 32 (or the radially outer peripheries of the claw-shaped magnetic pole portions 323) one by one. The staking process is performed on all the steel sheets 36 sequentially from that one of the steel sheets 36 which is first fitted onto the radially outer periphery of the field core 32.

Specifically, the staking process is first performed on the first steel sheet 36, forming a plurality (e.g., four in the present embodiment) of pairs of protrusions and recesses in the first steel sheet 36. For each pair of the protrusions and recesses, a part of the first steel sheet 36 is pressed backward (i.e., leftward in FIG. 3 and downward in FIG. 4) to form the protrusion on the rear end surface of the first steel sheet 36 while forming the recess in the front end surface of the first steel sheet 36.

In the present embodiment, each of the protrusions and recesses is formed into a substantially rectangular shape with its longer sides extending in the circumferential direction and its shorter sides extending in the axial direction of the core member 35. Moreover, each of the protrusions and recesses is formed over the entire radial width of the steel sheet 36. In addition, all of the protrusions and recesses are formed into substantially the same size.

Next, the staking process is performed on a second one of the steel sheets 36; the second steel sheet 36 is fitted on the radially outer periphery of the field core 32 so as to be axially superposed on the first steel sheet 36. Consequently, a plurality of pairs of protrusions and recesses are formed in the second steel sheet 36 in the same manner as in the first steel sheet 36. Moreover, each of the protrusions of the second steel sheet 36 is fitted into one of the recesses of the first steel sheet 36. As a result, the first and second steel sheets 36 are fixed to each other through engagement between the protrusions of the second steel sheet 36 and the recesses of the first steel sheet 36.

The above staking process is repeated on all of the remaining steel sheets 36. Consequently, all of the steel sheets 36 forming the core member 35, which adjoin one another in the lamination direction, are fixed to one another by the staking portions 37. Each of the staking portions 37 is constituted of those protrusions and recesses of all the steel sheets 36 which are fitted to one another and aligned in the lamination direction (or the axial direction of the core member 35). That is, each of the staking portions 37 is formed along the axial direction of the core member 35.

In addition, during the staking process, the electrically-insulating layers covering the axial end surfaces of the steel sheets 36 may be partially damaged, thereby making it easy for long-loop eddy current to be generated in the steel sheets 36.

In the present embodiment, the staking portions 37 are arranged at unequal pitches (or unequal intervals) in the circumferential direction of the core member 35 (or the circumferential direction of the rotor 30). Moreover, the number of the staking portions 37 arranged in the circumferential direction of the core member 35 is different from the number of the claw-shaped magnetic pole portions 323 of the field core 32.

More specifically, as shown in FIG. 5, in the present embodiment, the number of the staking portions 37 arranged in the circumferential direction of the core member 35 is equal to 4 while the number of the claw-shaped magnetic pole portions 323 of the field core 32 is equal to 16. Moreover, in FIG. 5, two of the four staking portions 37 are arranged to lie on a vertical imaginary line; the remaining two staking portions 37 are arranged to lie on an imaginary line that is circumferentially offset from a horizontal imaginary line by an angle θ. In addition, the angle θ for producing the unequal pitches may be set to an arbitrary valve.

With the above configuration, long-loop eddy current generated at the staking portions 37 and short-loop eddy current are mixed together to become high in frequency, thereby lowering the influence of the eddy current loss on the performance of the rotor 30.

In addition, the two staking portions 37, which lie on the imaginary line circumferentially offset from the horizontal imaginary line by the angle θ, are positioned on the q axis. In the present embodiment, the rotor 30 is a Lundell-type rotor where a large amount of magnetic flux flows along the d axis and variation in the magnetic flux flowing along the d axis is large. Therefore, to reduce the eddy current loss, it is preferable to provide the staking portions 37 on the q axis, not on the d axis.

Figure 6:
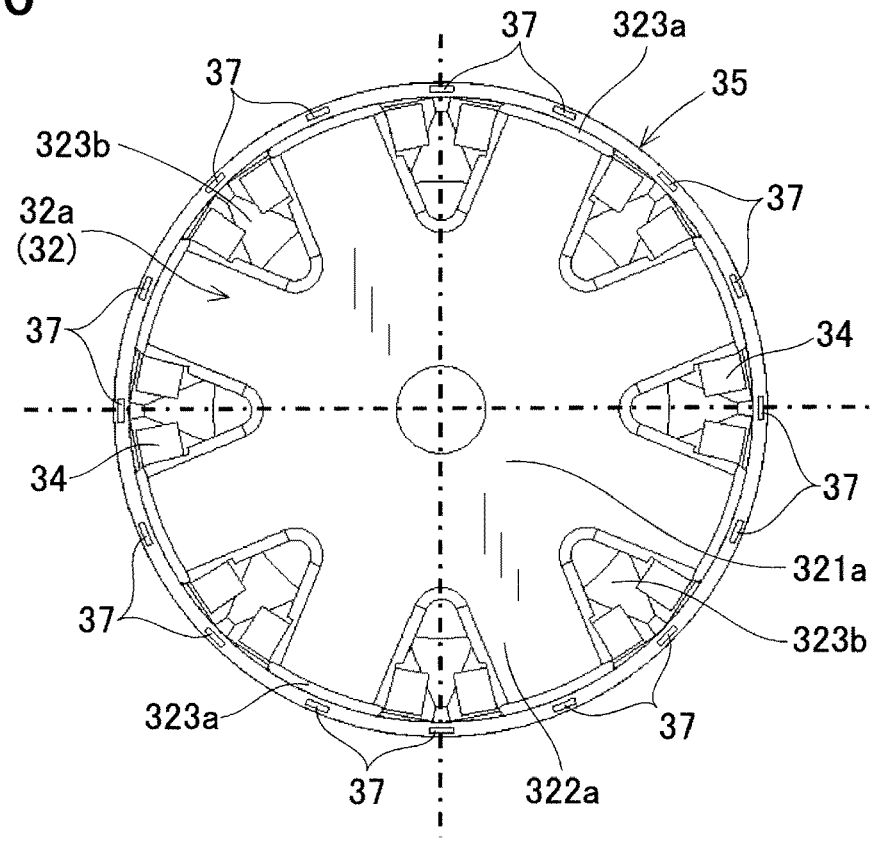
FIG. 6 is an axial end view of a rotor according to a comparative example.

FIG. 6 shows the configuration of a rotor according to a comparative example. In this rotor, there are formed sixteen staking portions 37 at a constant pitch in the circumferential direction of the core member 35. Moreover, the number of the claw-shaped magnetic pole portions 323 of the field core 32 is equal to 16. That is, the number of the staking portions 37 arranged in the circumferential direction of the core member 35 is equal to the number of the claw-shaped magnetic pole portions 323 of the field core 32.

Figure 8:
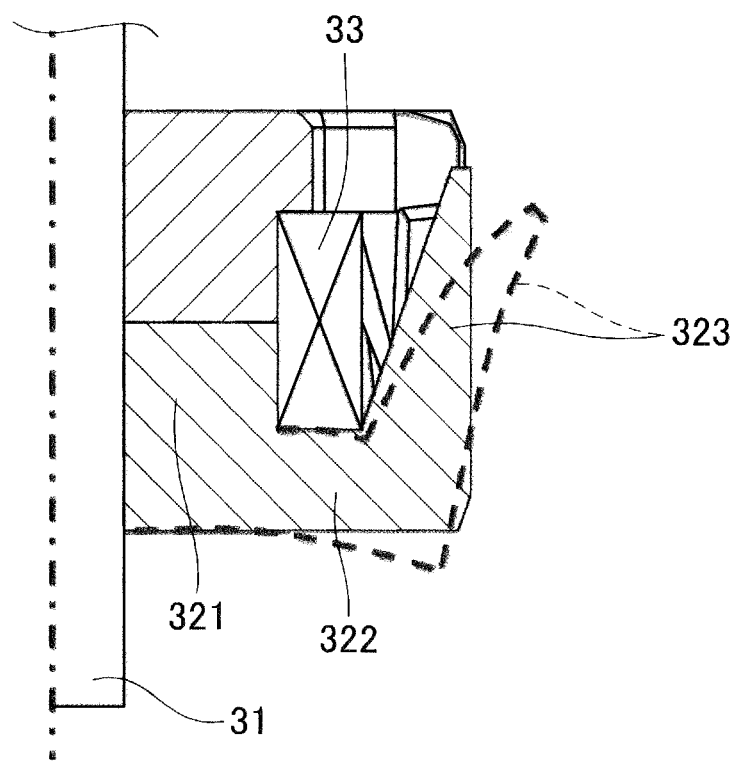
FIG. 8 is an explanatory diagram illustrating the radially outward deformation of claw-shaped magnetic pole portions of the rotor according to the exemplary embodiment due to the centrifugal force during rotation of the rotor.

In the rotor 30 according to the present embodiment, as shown in FIG. 8, the claw-shaped magnetic pole portions 323 of the field core 32 are deformed radially outward by the centrifugal force during rotation of the rotor 30. Moreover, the amount of radial deformation is small at proximal end parts (or root parts) of the claw-shaped magnetic pole portions 323, but large at distal end parts of the claw-shaped magnetic pole portions 323. That is, the amount of radially outward deformation of the claw-shaped magnetic pole portions 323 increases from the proximal end parts to the distal end parts. Moreover, the radially outward deformation of the claw-shaped magnetic pole portions 323 induces stress in the core member 35 that covers the radially outer peripheries of the claw-shaped magnetic pole portions 323 (see FIGS. 3-4). The closer to the distal end parts of the claw-shaped magnetic pole portions 323, the higher the stress induced in the core member 35. Consequently, concentration of the stress induced by the radially outward deformation of the claw-shaped magnetic pole portions 323 may occur in the core member 35. However, according to the present embodiment, all the steel sheets 36, which are laminated to form the core member 35, are fixed to one another by the staking portions 37. Therefore, the stress induced by the radially outward deformation of the claw-shaped magnetic pole portions 323 can be transferred between all the steel sheets 36 and thus evenly distributed in the core member 35. Consequently, it becomes possible to prevent concentration of the stress induced by the radially outward deformation of the claw-shaped magnetic pole portions 323 from occurring in the core member 35 and thereby ensure high strength of the core member 35.

The above-described rotor 30 according to the present embodiment has the following advantages.

In the present embodiment, the rotor 30 includes the field core 32, the field coil 33 and the hollow cylindrical core member 35. The field core 32 has the claw-shaped magnetic pole portions 323 (i.e., the first and second claw-shaped magnetic pole portions 323a and 323b of the first and second pole cores 32a and 32b). The field coil 33 is wound on the field core 32. The core member 35 is disposed to cover the radially outer peripheries of the claw-shaped magnetic pole portions 323 of the field core 32. The core member 35 is formed of the steel sheets 36 (or soft-magnetic bodies) that are laminated in the axial direction of the core member 35. All of the steel sheets 36 forming the core member 35 are fixed to one another by the staking portions 37 each of which is formed along the axial direction of the core member 35.

With the above configuration, the steel sheets 36 are fixed to one another with residual stress at the staking portions 37 dispersed in the circumferential direction of the core member 35 and thus without concentration of the residual stress in the core member 35. Moreover, during rotation of the rotor 30, the claw-shaped magnetic pole portions 323 of the field core 32 are deformed radially outward due to the centrifugal force, thereby inducing stress in the core member 35 that covers the radially outer peripheries of the claw-shaped magnetic pole portions 323. However, since all the steel sheets 36 are fixed to one another by the staking portions 37, the stress induced by the radially outward deformation of the claw-shaped magnetic pole portions 323 can be transferred between all the steel sheets 36 and thus evenly distributed in the core member 35. Consequently, it becomes possible to prevent concentration of the stress induced by the radially outward deformation of the claw-shaped magnetic pole portions 323 from occurring in the core member 35 and thereby ensure high strength of the core member 35.

In the present embodiment, the rotor 30 further includes the permanent magnets 34. Each of the permanent magnets 34 is arranged between one circumferentially-adjacent pair of the claw-shaped magnetic pole portions 323 with its axis of easy magnetization oriented in the circumferential direction of the core member 35 (or the circumferential direction of the rotor 30). Moreover, each of the permanent magnets 34 has its north pole facing one of the circumferentially-adjacent pair of the claw-shaped magnetic pole portions 323 which is magnetized to form a north pole upon energization of the field coil 33 and its south pole facing the other of the circumferentially-adjacent pair of the claw-shaped magnetic pole portions 323 which is magnetized to form a south pole upon energization of the field coil 33.

Consequently, with the permanent magnets 34, it is possible to reduce magnetic flux leakage between the claw-shaped magnetic pole portions 323 of the field core 32, thereby increasing the output power of the alternator 1. On the other hand, during rotation of the rotor 30, the permanent magnets 34 induce stress in the core member 35 due to the centrifugal force. However, in the present embodiment, as described above, all the steel sheets 36 forming the core member 35 are fixed to one another by the staking portions 37. Therefore, even with the stress induced by the permanent magnets 34 in the core member 35, it is still possible to ensure high strength of the core member 35.

In the present embodiment, the staking portions 37 are arranged at unequal pitches in the circumferential direction of the core member 35.

In forming the staking portions 37 by performing the staking process on the steel sheets 36, the electrically-insulating layers covering the axial end surfaces of the steel sheets 36 may be partially damaged. With the above arrangement of the staking portions 37, eddy current loops, which are caused by the damage of the electrically-insulating layers, are generated in the core member 35 at unequal pitches in the circumferential direction of the core member 35. Consequently, it is possible to reduce magnetic noise generated in the alternator 1.

In the present embodiment, the number of the staking portions 37 arranged in the circumferential direction of the core member 35 (i.e., 4) is different from the number of the claw-shaped magnetic pole portions 323 of the field core 32 (i.e., 16).

Setting the number of the staking portions 37 as above, the eddy current loops, which are generated in the core member 35 due to the damage of the electrically-insulating layers, are different from one-cycle loop in electrical angle of the alternator 1. Consequently, it is possible to further reduce the magnetic noise generated in the alternator 1.

[First Modification]

Figure 9:
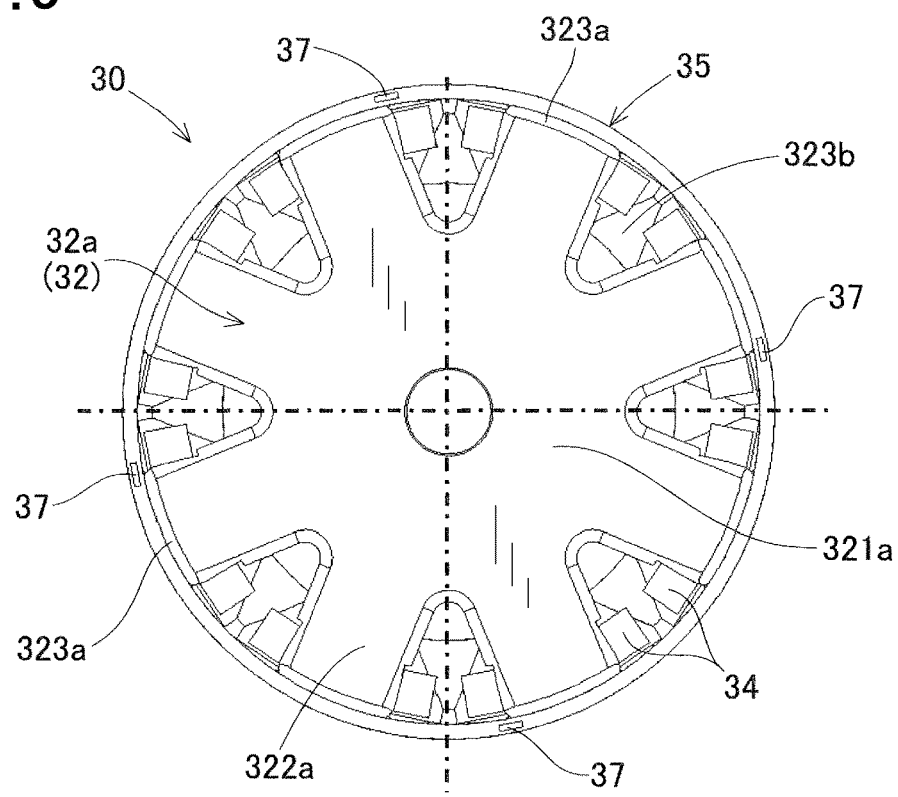
FIG. 9 is an axial end view of a rotor according to a first modification.

In this modification, as shown in FIG. 9, in the core member 35, there are formed four staking portions 37 at a constant pitch in the circumferential direction of the core member 35, unlike in the above-described embodiment. In addition, in this modification, the number of the claw-shaped magnetic pole portions 323 of the field core 32 (i.e., the number of the first and second claw-shaped magnetic pole portions 323a and 323b of the first and second pole cores 32a and 32b) is equal to 16. That is, the number of the staking portions 37 arranged in the circumferential direction of the core member 35 is different from the number of the claw-shaped magnetic pole portions 323 of the field core 32, as in the above-described embodiment.

[Second Modification]

Figure 10:
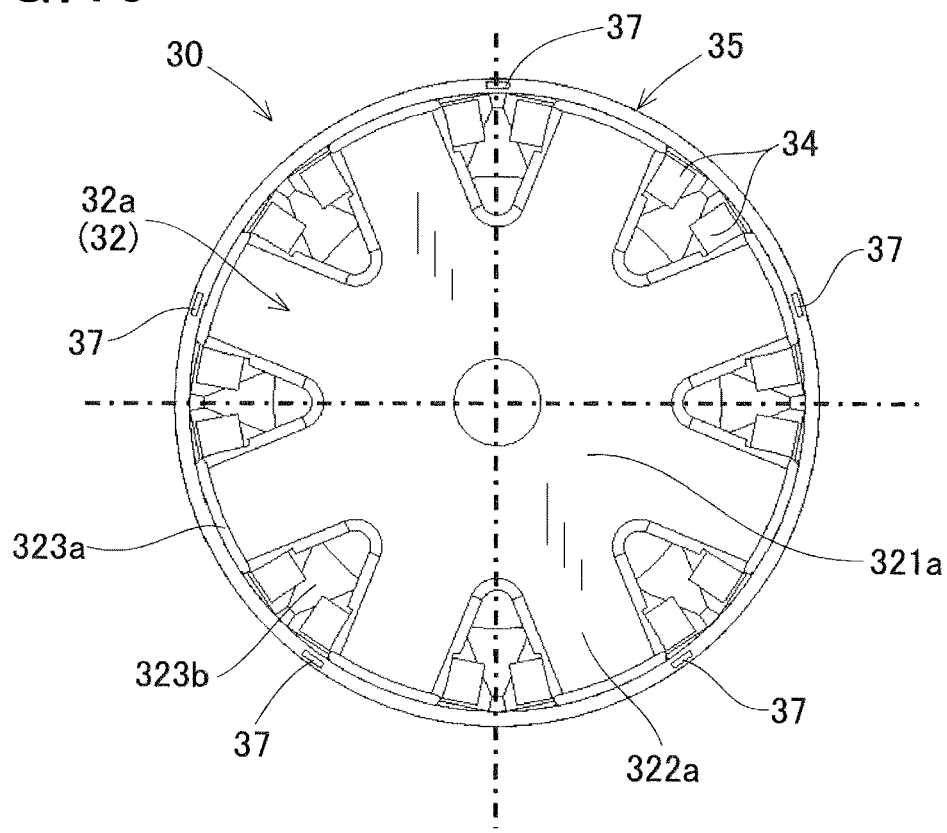
FIG. 10 is an axial end view of a rotor according to a second modification.

In this modification, as shown in FIG. 10, the number of the staking portions 37 arranged in the circumferential direction of the core member 35 is set to a prime number, more particularly to 5.

Setting the number of the staking portions 37 to a prime number, no constant-loop eddy current is generated in the core member 35. Consequently, it is possible to reduce the eddy current loss in the core member 35.

While the above particular embodiment and modifications have been shown and described, it will be understood by those skilled in the art that various further modifications, changes, and improvements may be made without departing from the spirit of the present invention.

For example, in the above-described embodiment, each of the staking portions 37 is formed over all of the steel sheets 36 forming the core member 35. However, each of the staking portions 37 may be formed over only some of the steel sheets 36.

In the above-described embodiment, the protrusions and recesses constituting the staking portions 37 are formed over the entire radial width of the annular steel sheets 36. However, the protrusions and recesses constituting the staking portions 37 may also be formed over only part of the radial width of the annular steel sheets 36, provided that it is possible to reliably form the staking portions 37 to fix the steel sheets 36 to one another.

In the above-described embodiment, all of the steel sheets 36 forming the core member 35 are fixed to one another by the four staking portions 37. However, it is also possible to fix only some of the steel sheets 36 forming the core member 35 to one another by at least one staking portion 37.

In addition, in terms of reducing the eddy current loss in the core member 35, it is preferable to set the number of the steel sheets 36 laminated to form the core member 35 as large as possible. However, in terms of reducing the eddy current loss in the permanent magnets 34, it is possible to obtain practical advantageous effects by axially dividing the core member 35 into, for example, four pieces.

In the above-described embodiment, the present invention is directed to the rotor 30 of the automotive alternator 1. However, the present invention can also be applied to rotors for other rotating electric machines, such as a rotor for an electric motor or a rotor for a motor-generator that selectively functions either as an electric motor or as an electric generator.

What is claimed is:

1. A rotor for a rotating electric machine, the rotor comprising:
   a field core having a plurality of claw-shaped magnetic pole portions;
   a field coil wound on the field core; and
   a hollow cylindrical core member disposed to cover radially outer peripheries of the claw-shaped magnetic pole portions of the field core,
   wherein
   the core member is formed of a plurality of soft-magnetic bodies that are laminated in an axial direction of the core member,
   at least some of the soft-magnetic bodies forming the core member are fixed to one another by at least one staking portion that is formed along the axial direction of the core member,
   the at least one staking portion comprises a plurality of staking portions each of which is formed along the axial direction of the core member, and
   the plurality of staking portions are arranged at unequal pitches in a circumferential direction of the core member.

2. The rotor as set forth in claim 1, further comprising a plurality of permanent magnets, wherein each of the permanent magnets is arranged between one circumferentially-adjacent pair of the claw-shaped magnetic pole portions with its axis of easy magnetization oriented in a circumferential direction of the core member, and
   each of the permanent magnets has its north pole facing one of the circumferentially-adjacent pair of the claw-shaped magnetic pole portions which is magnetized to form a north pole upon energization of the field coil and its south pole facing the other of the circumferentially-adjacent pair of the claw-shaped magnetic pole portions which is magnetized to form a south pole upon energization of the field coil.

3. The rotor as set forth in claim 1, wherein the number of the at least one staking portion in a circumferential direction of the core member is set to be different from the number of the claw-shaped magnetic pole portions of the field core.

4. The rotor as set forth in claim 3, wherein the number of the at least one staking portion in the circumferential direction of the core member is set to a prime number.

5. The rotor as set forth in claim 1, wherein all of the soft-magnetic bodies forming the core member are fixed to one another by the at least one staking portion.

6. The rotor as set forth in claim 1, wherein the claw-shaped magnetic pole portions of the field core comprise a plurality of first claw-shaped magnetic pole portions and a plurality of second claw-shaped magnetic pole portions,
   the field core consists of a pair of first and second pole cores,
   the first pole core has a first boss portion, a plurality of first disc portions and the first claw-shaped magnetic pole portions, the first boss portion being cylindrical in shape, the first disc portions each extending radially outward from an axially outer part of the first boss portion and being circumferentially spaced at a predetermined pitch, each of the first claw-shaped magnetic pole portions axially extending toward the second pole core from a radially outer part of one of the first disc portions,
   the second pole core has a second boss portion, a plurality of second disc portions and the second claw-shaped magnetic pole portions, the second boss portion being cylindrical in shape, the second disc portions each extending radially outward from an axially outer part of the second boss portion and being circumferentially spaced at a predetermined pitch, each of the second claw-shaped magnetic pole portions axially extending toward the first pole core from a radially outer part of one of the second disc portions, the first claw-shaped magnetic pole portions of the first pole core are interleaved with the second claw-shaped magnetic pole portions of the second pole core, and the field coil is wound on radially outer peripheries of the first and second boss portions so that upon energization of the field coil, the first and second claw-shaped magnetic pole portions are magnetized to respectively form a plurality of magnetic poles whose polarities alternate between north and south in a circumferential direction of the core member.

\* \* \* \* \*